(No Model.) 2 Sheets—Sheet 1.

T. M. TOPP.
FRUIT CUTTING AND PITTING MACHINE.

No. 596,343. Patented Dec. 28, 1897.

Witnesses,

Inventor,
Thomas M. Topp
By Dewey & Co
Attys (No Model.) 2 Sheets—Sheet 2.

T. M. TOPP.
FRUIT CUTTING AND PITTING MACHINE.

No. 596,343. Patented Dec. 28, 1897.

Witnesses,

Inventor
Thomas M. Topp
By Dewey & Co

UNITED STATES PATENT OFFICE.

THOMAS M. TOPP, OF SACRAMENTO, CALIFORNIA.

FRUIT CUTTING AND PITTING MACHINE.

SPECIFICATION forming part of Letters Patent No. 596,343, dated December 28, 1897.

Application filed September 20, 1897. Serial No. 652,261. (No model.)

*To all whom it may concern:*

Be it known that I, THOMAS M. TOPP, a citizen of the United States, residing at Sacramento, county of Sacramento, State of California, have invented an Improvement in Fruit Cutting and Pitting Machines; and I hereby declare the following to be a full, clear, and exact description of the same.

My invention relates to a device which is especially designed for removing the pits from fruits, such as apricots, peaches, and similar fruits.

It consists of a pair of cutting-disks mounted to rotate in opposition and in essentially the same plane, the edges meeting, so that anything passed between them would be cut in two. The edges of these disks are provided with depressions at intervals, and upon each side of the depressions are hinged corresponding cups or holders for the fruit, which is so held that the pit will be received by the openings in the edges of the knives, while the latter will cut through the flesh of the fruit, and by suitable means the fruit is separated from the pit before leaving the apparatus.

It also consists in details of construction which will be more fully explained by reference to the accompanying drawings, in which—

Figure 1:
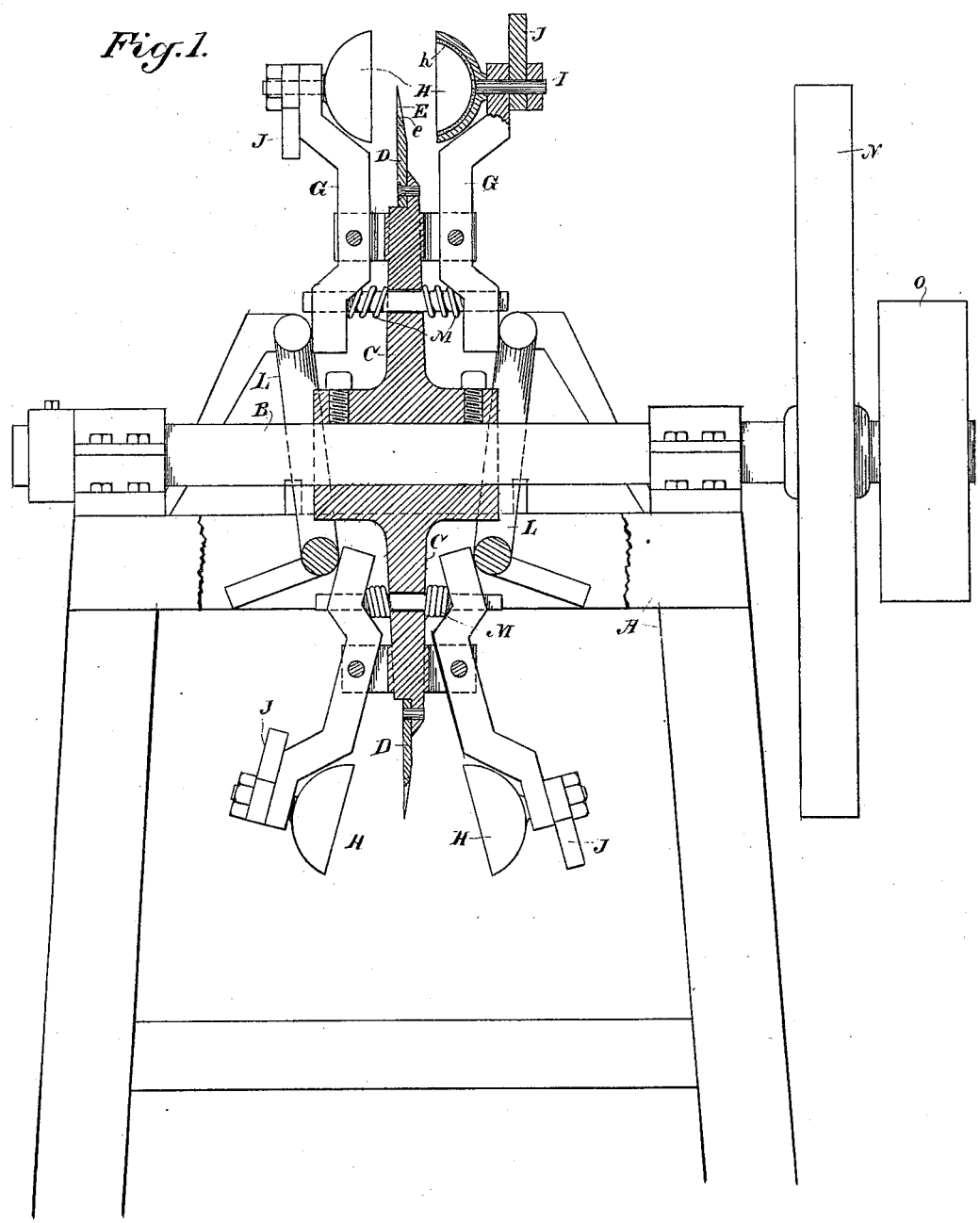
Figure 2:
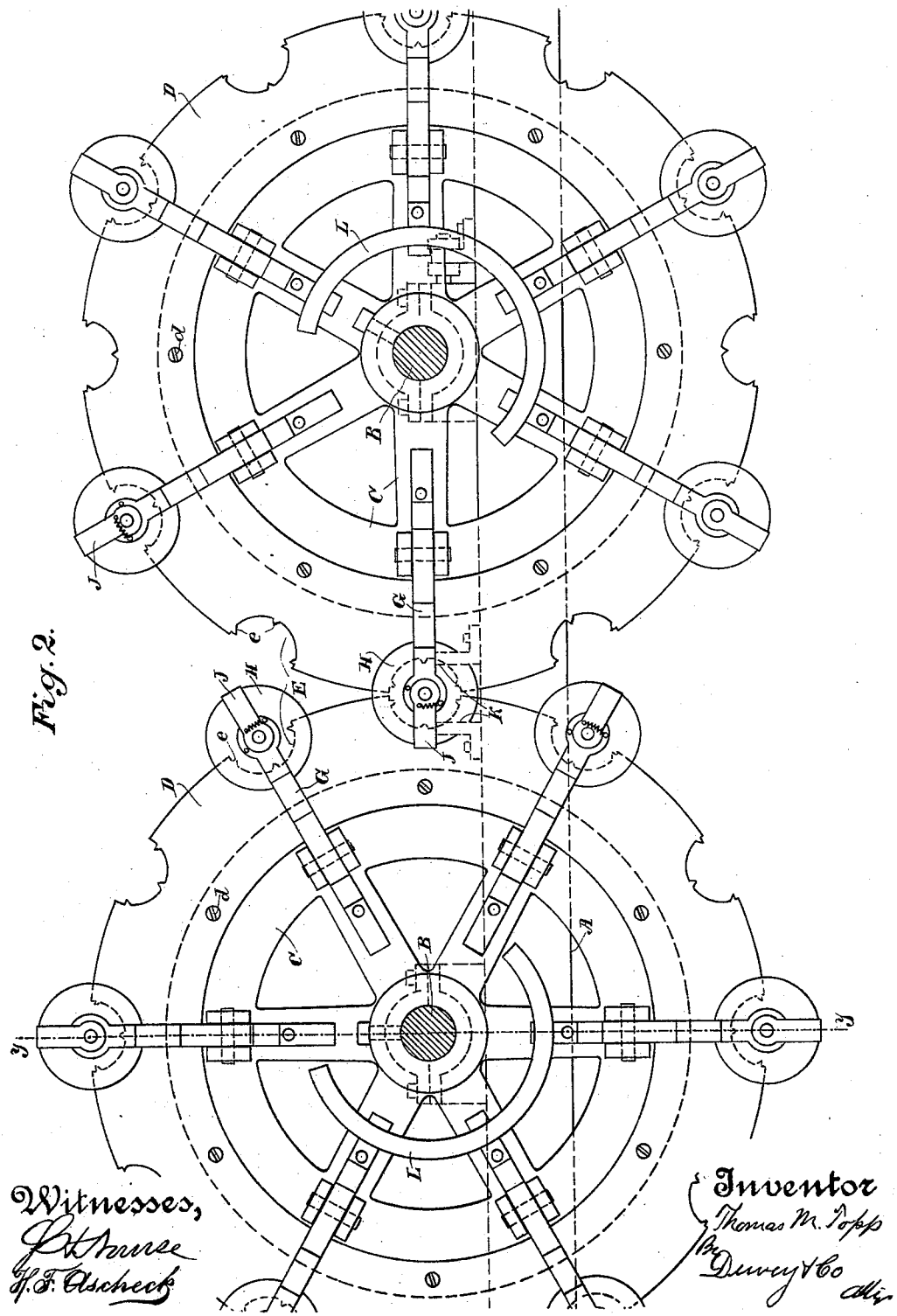

Figure 1 is a vertical transverse section on line $y\ y$ of Fig. 2. Fig. 2 is a side elevation of my apparatus.

Any suitable framework or support A may be employed as the base of my apparatus. Upon this are journaled shafts B, and to these shafts are fixed hubs or centers C, the peripheries of which are adapted to receive the annular cutters D. The cutters are here shown as fitting flanges of the castings C and secured thereto by screw-bolts $d$. These annular cutters may be made of considerable thickness at the inner edges and they are beveled to a thin cutting edge at the periphery.

At intervals around the peripheries of the cutters are semicircular depressions E, having projections $e$, which serve to grasp the pit of the fruit when the latter reaches the point where it is to be cut.

Upon each side of the center or carrier C are hinged arms G, and the outer ends of these arms support the holders H for the fruit. These holders are here shown as concave and of any suitable or desired shape, preferably having soft elastic cushions or lining material $h$, within which to allow them to adjust themselves within small limits to varying sizes of the fruit and not to crush it. These holders are here shown with rearwardly-extending pivot-pins or shafts I, which are turnable within the jaws H. These shafts have projecting arms J fixed to them and so disposed that when they reach a certain point after the fruit has been cut they form contact with projections or lugs K, and this twists them while the fruit is still within the cups or holders and after it has been cut, so that by the twist thus given the flesh of the fruit is separated from the pit.

The opening and closing of the cups H are effected by means of curved arcs L, which are disposed in a converging or cam shape with relation to the position of the cutters, so that the inner ends of the fulcrumed arms G will form contact with these cams and be closed toward each other as they pass between the cams to separate the outer ends and open the cups which contain the fruit and allow the latter to be placed in the cups and after being cut to drop out of the cups. Springs M act upon the arms G to close the cups after the fruit has been introduced and the arms G are clear of the cams L.

The cutters are mounted in pairs upon the supporting-framework, with their edges running closely together, and they are connected by suitable gears N, so as to rotate in unison.

Power may be applied either by hand or through the pulley O or in any other suitable manner.

The peripheries of the cutters are, as before described, formed with the concavities E and the cups H upon each side of each of the concavities.

Each of the disks of the two wheels has a set of cups and concavities, and they meet alternately as the cutters are rotated, so that they may be fed upon both sides of the machine.

The cups are held apart by the cams L, so that they are open for the reception of the fruit when passing in front of the feeder, and as soon as this point is passed the arms G leave the cams L and the springs M act to close the cups lightly upon the fruit.

When the fruit reaches the point where the two edges of the cutters D come together, they will cut through the flesh, and as the pit-openings E register with each other the pit will be held in these openings by the points e, while the further movement of the apparatus causes the arms J to contact with the projections or lugs K, and thus twist the two cups H in opposite directions, which serves to separate the cut halves from the pit, and as the continued rotation of the cutters carries the cut fruit down below the horizontal line where the cutters meet the arms G will again engage the cams L and be thus opened to drop both fruit and pit. The operation is thus carried on with rapidity and accuracy.

Having thus described my invention, what I claim as new, and desire to secure by Letters Patent, is—

1. In a fruit cutting and pitting machine, the combination of coöperating rotary cutters, cups movable with and hinged upon opposite sides of the cutters and means for operating the cutters said cutters having coöperating concavities and hold the fruit-pits while the cutting takes place.

2. A device for cutting and pitting fruit consisting of circular sharp-edged cutters mounted and journaled to rotate with their edges meeting in a common plane, said cutters having concavities or spaces formed in their edges and adapted to register with each other, said concavities having projecting points in the bottom to hold the fruit-pits, cups mounted upon opposite sides of the cutters and adapted to grasp and hold the fruit centrally in the plane of the knives and with the pit in the line of its holding-depressions whereby the fruit is cut and the pit grasped when the cutters are rotated so as to meet and part from each other.

3. In a device for cutting and pitting fruit, a pair of circular rotary cutters, shafts upon which they are mounted so that their edges meet in the same plane, and mechanism by which the cutters are rotated in unison, concaved depressions with holding-points formed in each of the cutting-blades so as to register when the blades are rotated, holding-cups with hinged arms mounted upon opposite sides of the blades, cams fixed with relation to the hinged arms so that the cups are opened at the point to receive the fruit, springs whereby the cups are closed to hold the fruit in line with the cutting-blades after the lever-arms have passed the cams.

4. In a fruit cutting and pitting device, a pair of circular cutters mounted to rotate in the same plane with their edges meeting, concavities or depressions formed in the edges of the blades and registering to receive the pits of the fruit, cups or holders with hinged arms adapted to open to receive the fruit and closed to hold it in line with the cutting edges of the pit-holders, said cups having a soft or yielding lining whereby they adjust themselves to the fruit without bruising it.

5. In a device for cutting and pitting fruit, a pair of circular disks mounted to rotate with their peripheral edges meeting in a single plane, concavities or depressions formed in each of the cutters having holding-points within the depressions and registering so as to seize and hold the fruit-pit when the cut takes place, hinged arms having cups mounted at the outer end adapted to grasp the fruit and hold it in line with the edges of the cutters, shafts or pins carrying the cups, arms connected with said shafts or pins and fixed lugs upon the machine with which said arms contact whereby the cups are turned on their axis and a twisting movement given to the fruit after it has been cut to release it from the pit.

In witness whereof I have hereunto set my hand.

THOMAS M. TOPP.

Witnesses:
S. H. NOURSE,
JESSIE C. BRODIE.